(12) United States Patent
Sawada et al.

(10) Patent No.: US 11,396,381 B2
(45) Date of Patent: Jul. 26, 2022

(54) AIRCRAFT LAMP THAT CHANGES IRRADIATION DIRECTION

(71) Applicant: KOITO MANUFACTURING CO., LTD., Tokyo (JP)

(72) Inventors: Shigeo Sawada, Shizuoka (JP); Akio Shoji, Shizuoka (JP); Mikio Urushibata, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/343,382

(22) Filed: Jun. 9, 2021

(65) Prior Publication Data
US 2021/0394925 A1 Dec. 23, 2021

(30) Foreign Application Priority Data
Jun. 18, 2020 (JP) .............................. JP2020-105476

(51) Int. Cl.
*B64D 47/04* (2006.01)
*B60Q 1/12* (2006.01)
*B60Q 1/00* (2006.01)

(52) U.S. Cl.
CPC ........... *B64D 47/04* (2013.01); *B60Q 1/0023* (2013.01); *B60Q 1/0035* (2013.01); *B60Q 1/12* (2013.01); *B60Q 2300/122* (2013.01); *B60Q 2300/132* (2013.01); *B60Q 2300/134* (2013.01); *B60Q 2300/136* (2013.01); *B64D 2203/00* (2013.01)

(58) Field of Classification Search
CPC ................ B64D 47/04; B60Q 2300/13; B60Q 2300/132; B60Q 2300/134; B60Q 2300/136; B60Q 2300/12; B60Q 2300/124; B60Q 2300/126; B60Q 2300/128
See application file for complete search history.

(56) References Cited

U.S. PATENT DOCUMENTS

| | | | |
|---|---|---|---|
| 9,856,035 B1 * | 1/2018 | Keller | B64D 47/04 |
| 10,583,936 B2 * | 3/2020 | Robledo Bueno | B64D 47/04 |
| 2017/0203855 A1 * | 7/2017 | Leclear | B64D 47/06 |

FOREIGN PATENT DOCUMENTS

JP 2011-246028 A 12/2011

* cited by examiner

*Primary Examiner* — Robert J May
(74) *Attorney, Agent, or Firm* — Venjuris, P.C.

(57) ABSTRACT

An aircraft lamp includes a variable lamp unit in which an irradiation direction of light by a light source changes; a behavior detection unit that detects behavior of an airframe; and a controller that controls the irradiation direction of the light by the variable lamp unit based on a detection result of the behavior of the airframe.

5 Claims, 9 Drawing Sheets

AIRCRAFT LAMP THAT CHANGES IRRADIATION DIRECTION

CROSS-REFERENCE TO RELATED APPLICATIONS

This application is based on and claims priority from Japanese Patent Application No. 2020-105476, filed on Jun. 18, 2020, with the Japan Patent Office, the disclosure of which is incorporated herein in its entirety by reference.

TECHNICAL FIELD

The present disclosure relates to an aircraft lamp with an irradiation direction changed based on behavior of an airframe.

BACKGROUND

Japanese Patent Laid-Open Publication No. 2011-246028 discloses an aircraft illumination device capable of switching an irradiation direction of an illumination lamp between a first mode (leftward or upward) and a second mode (rightward or downward) by using an actuator that rotates the illumination lamp and a rotation regulating unit formed with a convex portion and a curved groove (or energization release by two micros witches).

SUMMARY

Aircraft irradiation light with a fixed irradiation direction of light from an airframe may cause blurring in the irradiation direction based on the behavior of the airframe or may not be able to irradiate an appropriate direction according to the direction of the airframe. Thus, there is a problem in that it is not possible to appropriately irradiate the field of view required by an operator of the aircraft.

Meanwhile, in the aircraft illumination device disclosed in Japanese Patent Laid-Open Publication No. 2011-246028, the irradiation direction is switched only in two directions based on the operation by the operator. Thus, there is a problem in that it is not possible to irradiate the appropriate field of view required by the operator of the aircraft based on the behavior of the airframe.

In view of the above-mentioned problems, the present disclosure is to provide an aircraft lamp capable of irradiating an appropriate field of view required by an operator of an aircraft based on the behavior of the airframe.

An aircraft lamp includes a variable lamp unit in which an irradiation direction of light by a light source changes; a behavior detection unit that detects behavior of an airframe; and a controller that controls the irradiation direction of the light by the variable lamp unit based on a detection result of the behavior of the airframe.

(Effect) The irradiation direction of the irradiation light by the variable lamp unit is automatically changed based on the detected behavior of the airframe.

Further, in the aircraft lamp, the behavior detection unit may be an elevation angle sensor that detects an elevation angle of the airframe. The controller may calculate a vertical irradiation angle of the variable lamp unit by adding a predetermined angle to the detected elevation angle. The variable lamp unit may irradiate light on a vertical plane including a traveling direction of the airframe by tilting the light with an amount of the vertical irradiation angle from the traveling direction of the airframe.

(Effect) Even when the nose of the aircraft is oriented in any of the horizontal direction, an oblique upward direction, or an oblique downward direction, the variable lamp unit changes the irradiation direction of the irradiation light according to the behavior of the airframe, and always irradiates the irradiation light in a constant direction at a predetermined angle from the horizontal direction.

Further, in the aircraft lamp, the behavior detection unit may be a sensor that detects a left-right tilt of the airframe from a horizontal direction as a left-right tilt angle. The controller may calculate a left-right irradiation angle of the variable lamp unit from the left-right tilt angle of the airframe. The variable lamp unit may irradiate light on a plane perpendicular to the traveling direction of the airframe by tilting the light with an amount of the left-right irradiation angle from a directly downward direction of the airframe in a direction opposite to a left-right tilt direction of the airframe.

(Effect) When the airframe is tilted in the left-right direction, the variable lamp unit irradiates the irradiation light by tilting the light with an amount of the left-right tilt angle of the airframe in the direction opposite to the tilt direction of the airframe, and offsets and prevents the tilt of the irradiation light with respect to the vertical plane including the traveling direction of the airframe.

Further, in the aircraft lamp, the behavior detection unit may be a steering angle sensor that detects a steering direction and a steering angle of the airframe. The controller may calculate a left-right direction steering irradiation angle of the variable lamp unit from the detected steering angle of the airframe. The variable lamp unit may irradiate light by tilting the light with an amount of the left-right direction steering irradiation angle in the steering direction from the traveling direction of the airframe.

(Effect) As the aircraft traveling on a runway is steered to the left and right, the irradiation direction of the irradiation light by the variable lamp unit is changed to the steering direction by the amount of the left-right direction steering irradiation angle based on the steering angle from the front-rear direction of the airframe.

Further, in the aircraft lamp, the variable lamp unit may be provided in the vicinity of the base end portion of the main wing of the airframe.

(Effect) The variable lamp unit provided in the vicinity of the base end portion of the main wing irradiates irradiation light forward of the airframe including the front side of the fuselage.

Further, the aircraft lamp may further include a plurality of the variable lamp units. The plurality of variable lamp units may include a first variable lamp unit and a second variable lamp unit.

(Effect) The plurality of variable lamp units irradiate light that complements light each other, or irradiate light used for a different purpose.

According to the aircraft lamp, an appropriate field of view required by the operator of the aircraft based on the behavior of the airframe.

According to the aircraft lamp, even when the direction of the nose is arbitrary changed in accordance with the behavior of the aircraft, the variable lamp unit irradiates the irradiation light in a constant direction from the horizontal direction, so that blurring of the irradiation direction in the front-rear direction according to the behavior of the aircraft is not caused in the irradiation light, and the field of view of the operator is appropriately illuminated.

According to the aircraft irradiation light, even when the airframe is tilted in the left-right direction with respect to the horizontal direction in accordance with the behavior of the aircraft, the irradiation direction of the irradiation light by the variable lamp unit is not tilted with respect to the vertical plane including the traveling direction of the airframe, so that blurring of the irradiation direction in the left-right direction according to the behavior of the aircraft is not caused in the irradiation light, and the field of view of the operator is appropriately illuminated.

According to the aircraft lamp, the direction of the irradiation light by the variable lamp unit is changed according to the steering direction and the steering angle, and the field of view of the operator is appropriately illuminated by appropriately irradiating the traveling direction of the aircraft during cornering.

according to the aircraft lamp, the variable lamp unit or the like provided in the vicinity of the base end portion of the main wing of the airframe is hardly affected due to impact during landing as compared with those provided on the upper portion of the wheel, and additionally, the illuminating of the front side of the fuselage does not become dark by irradiating the fuselage direction of the airframe.

According to the aircraft lamp, the first and the second variable lamp units appropriately illuminates the front side during take-off, landing and ground traveling of the aircraft.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Hereinafter, very proper embodiments of the present disclosure will be described based on FIGS. 1A to 9B. In each drawing, in an aircraft on which an aircraft lamp (not illustrated) is mounted, directions viewed from an operator are described as (upward:downward:leftward:rightward: front:rear=Up:Lo:Le:Ri:Fr:Re).

Figure 1A:
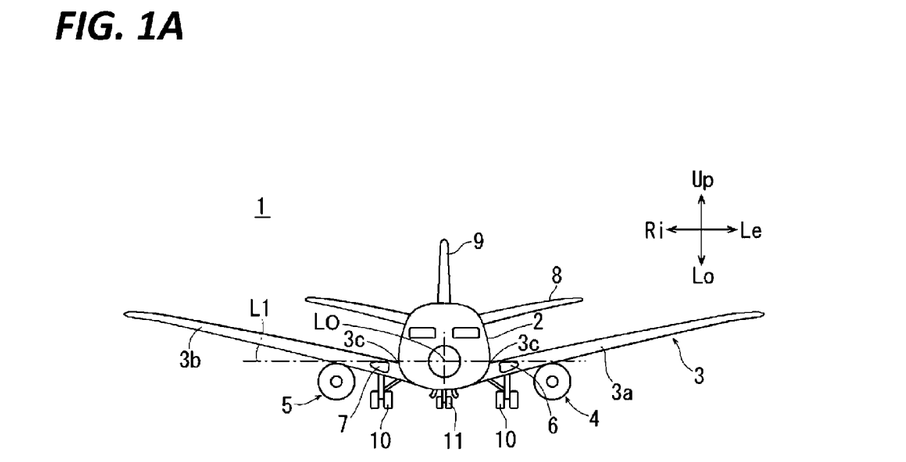
FIG. 1A is a front view of an aircraft on which an aircraft lamp according to an embodiment is mounted.
Figure 1B:
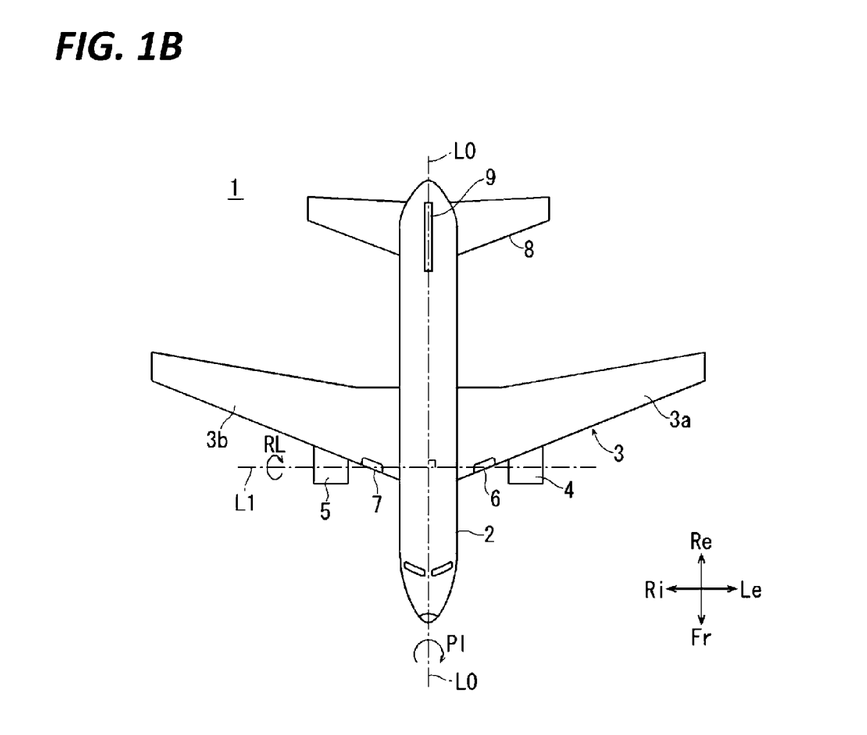
FIG. 1B is a plan view of the aircraft on which the aircraft lamp according to the embodiment is mounted.

FIGS. 1A and 1B illustrate an aircraft on which an aircraft lamp according to an embodiment is mounted. An aircraft 1 includes a fuselage 2, main wings 3, engines 4 and 5, a left-side aircraft lamp 6, a right-side aircraft lamp 7, horizontal tail wings 8, a vertical tail wing 9, main legs 10, and a front leg 11.

As illustrated in FIGS. 1A and 1B, the left-side aircraft lamp 6 is provided in the vicinity of a base end portion 3c of a left-side main wing 3a in a state of being oriented forward, and the right-side aircraft lamp 7 is also provided in the vicinity of a base end portion 3c of a right-side main wing 3b in a state of being oriented forward.

Figure 2:
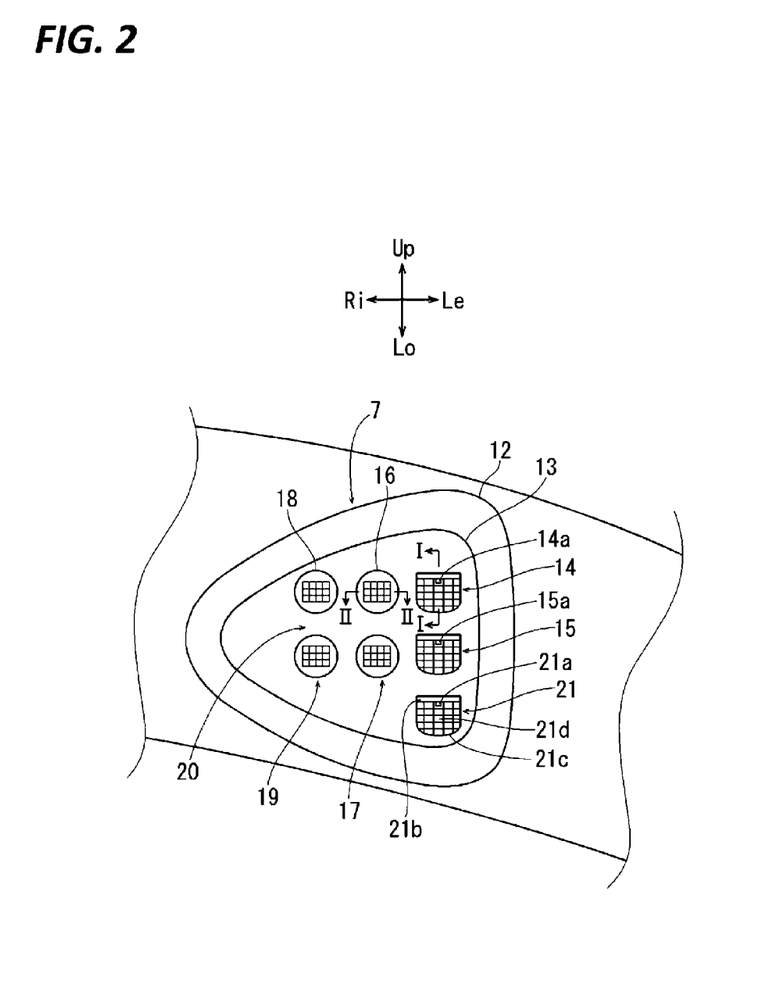
FIG. 2 is an enlarged front view of the aircraft lamp according to an embodiment is mounted.

The right-side aircraft lamp 7 illustrated in FIG. 2 includes a lamp body 12, a pair of first landing lamp units 14 and 15 that are first mechanical variable lamp units, a second electronic variable lamp unit 20, and a second landing lamp unit 21, which are provided in a lamp chamber 51 configured inside a front cover 13. The second variable lamp unit 20 is constituted by a pair of traveling lamp units 16 and 17, and a pair of turn-off light units 18 and 19. The pair of traveling lamp units 16 and 17 is disposed toward the front of the front side of the aircraft 1, and the pair of turn-off light units 18 and 19 is disposed toward the front side oblique to the right side. The left-side aircraft lamp 6 has a configuration (not illustrated) in which the same components as the right-side aircraft lamp 7 are disposed symmetrically in the left-right direction.

Figure 3:
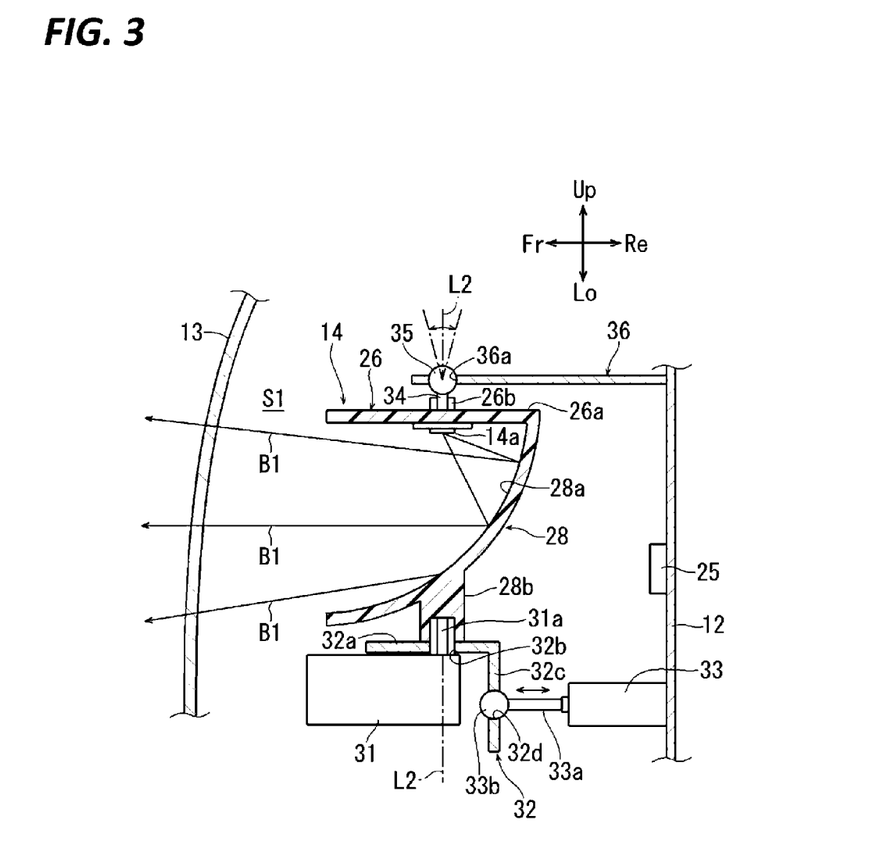
FIG. 3 is a vertical cross-sectional view taken along line I-I in FIG. 2 illustrating a mechanical variable lamp unit.

The first landing lamp unit 14 illustrated in FIGS. 2 and 3 includes a control device (controller) 25 attached to the lamp body 12, a light source support 26, a first light source 14a constituted by a white LED fixed downward to the light source, and a reflector 28 integrated at a rear end portion of the light source support 26. The reflector 28 is integrally formed at a rear end portion 26a of the light source support 26, and is disposed below the light source support 26. The reflector 28 has a parabolic shape and has a reflecting surface 28a formed by, for example, vapor deposition of aluminum on the front surface. However, the light source may adopt a light emitting element light source such as a laser diode instead of an LED.

Light B1 emitted from the first light source 14a illustrated in FIG. 3 becomes diffused light reflected by the reflecting surface 28a of the reflector 28 and is irradiated forward of the front cover 13, and forms a predetermined light distribution pattern, for example, on the runway at the front side of the aircraft. A bearing portion 28b is provided on the outer side of the reflector 28, and a bearing portion 26b, which is coaxial (center axis L2) with the bearing portion 28b, is provided on the outer side of the light source support 26. A driving shaft 31a of a swivel motor 31, which is a servo motor, is fixed to the bearing portion 28b, and the reflector 28 is supported by a horizontal plate 32a of a leveling bracket 32 in a state where the driving shaft 31a is rotatably inserted into a circular hole 32b.

The leveling bracket 32 in FIG. 3 includes a vertical plate 32c extending downward from the horizontal plate 32a extending in the horizontal direction, and a ball receiving portion 32d of the vertical plate 32c. An actuator 33 including an arm 33a with a ball portion 33b that moves back and forth electrically or hydraulically is provided on the front surface of the lamp body 12, and the leveling bracket 32 is supported by the lamp body 12 by rotatably engaging the ball portion 33b at the tip end of the arm 33a with the ball receiving portion 32d of the vertical plate 32c. Meanwhile, a swivel shaft 34 integrally including a ball portion 35 at the upper end is fixed to the bearing portion 26b of the light source support 26. A support bracket 36 including a ball receiving portion 36a is protrusively provided on the front surface of the lamp body 12, and the light source support 26 is held by the lamp body 12 by rotatably engaging the ball portion 35 with the ball receiving portion 36a.

Figure 5A:
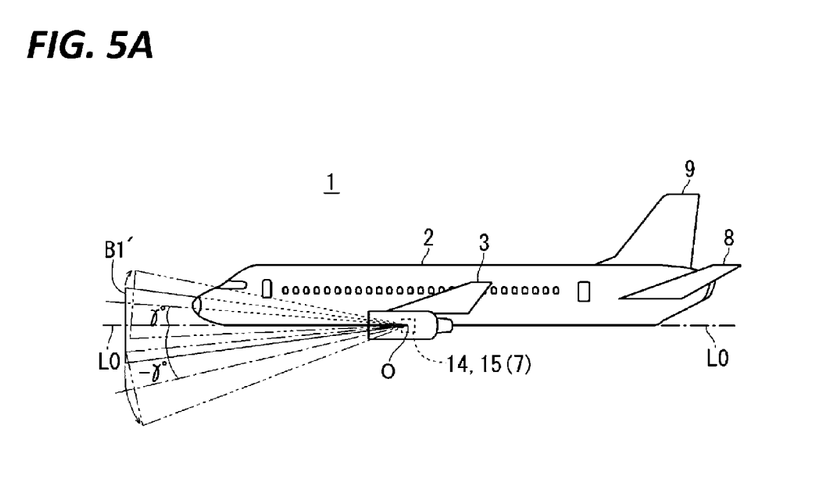
FIG. 5A is an explanatory view of an action of a first landing lamp unit, which is a first variable lamp unit.

The first landing lamp unit 14 in FIG. 3 is swung around the ball portion 35 by the actuator 33 that receives advance/retreat action control in the front-rear direction of the arm 33a by the control device 25, and is tilted (leveling action) upward or downward. The first landing lamp unit 15 in FIG. 2 has the same configuration as the first landing lamp unit 14 (but, the light source is indicated as a second light source 15a for convenience of descriptions), and is disposed below the first landing lamp unit 14. The first landing lamp units 14 and 15 controlled by the control device 25 tilts the irradiation direction of the light distribution pattern by synthetic light B1' formed in conjunction with each other as illustrated in FIG. 5A upward or downward by a predetermined vertical irradiation angle γ (with the position of the right-side aircraft lamp as a center of rotation O, the upward tilt from the straight line L0 is positive, and the downward tilt is negative) based on the advance/retreat position of the arm 33a from the traveling direction (forward along the straight line L0 extending in the longitudinal direction of the fuselage of the airframe) of the aircraft 1, and functions as a take-off/landing light. Further, the first landing lamp units 14 and 15 may be swung (swivel action) leftward or rightward with the center axis L2 as the center by the swivel motor 31 that receives the rotation control of the driving shaft 31a by the control device 25, the irradiation direction of the light distribution pattern by the synthetic light B1' may be tilted leftward or rightward at a predetermined angle from the traveling direction of the aircraft 1, and the take-off/landing lamp that irradiates forward and oblique downward may be tilted in the left-right direction.

However, since it is sufficient that the first landing lamp unit 14 according to the embodiment is able to perform the leveling operation, the swivel motor 31 may be omitted and the reflector 28 may be fixed to the leveling bracket 32. Further, the first landing lamp unit 15 has the same configuration as the first landing lamp unit 14 (but, the light source is indicated as a second light source 15a for convenience of description), and is disposed below the first landing lamp unit 14.

Figure 5B:
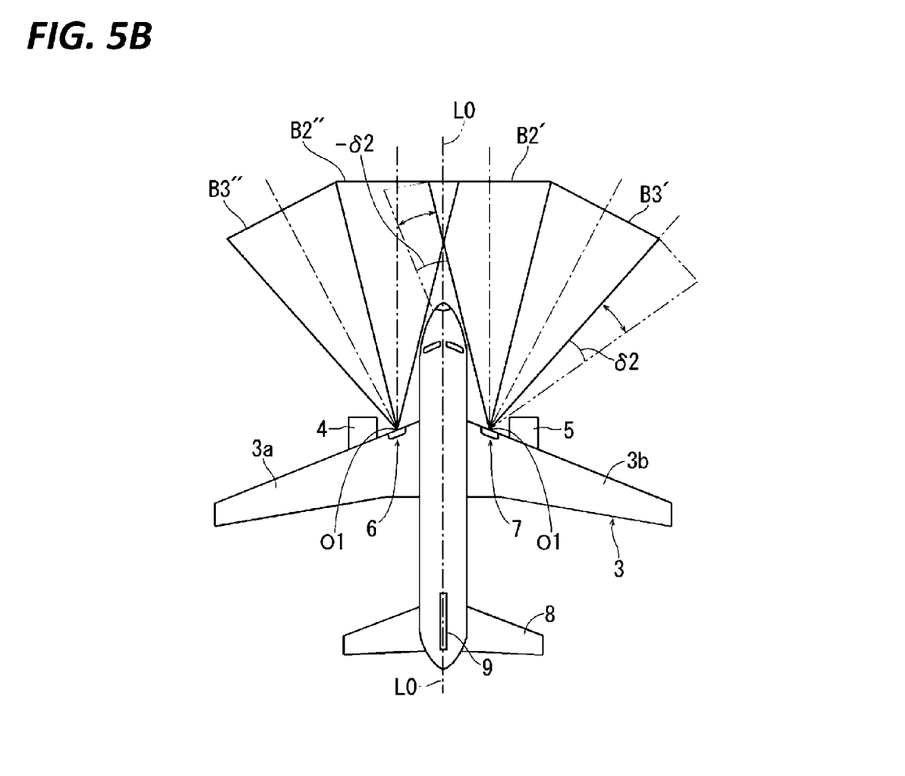
FIG. 5B is an explanatory view of an action of a traveling lamp unit and a turn-off light unit, which are second variable lamp units.

Further, the second landing lamp unit 21 illustrated in FIG. 2 is a fixed landing lamp unit, includes a third light source 21a constituted by an LED, a light source support 21b fixed to the lamp body 12, and a reflector 21c having a reflecting surface 21d oriented forward, reflects light by the third light source 21a forward to be in parallel with the straight line L0 extending in the longitudinal direction of the fuselage 2 of the aircraft 1 as illustrated in FIGS. 5A and 5B, and irradiates the light distribution pattern at the time of the ground gliding of the aircraft 1.

Next, the traveling lamp unit 16 will be described with reference to FIGS. 4A to 4C. Meanwhile, as illustrated in FIG. 2, all of the traveling lamp unit 17 provided below the traveling lamp unit 16 and the turn-off light units 18 and 19 disposed in pairs on the right side of the traveling lamp units 16 and 17 have the same configuration as the traveling lamp unit 16, and are connected to the control device 25 to receive the action control including turn-on/off of the light source. However, for convenience of description, the light source of the traveling lamp unit 17 is referred to as a second LED array 49, and the light sources of the turn-off light units 18 and 19 are described as fourth LED arrays 50 and 51 in the traveling lamp unit 16 (to be described later).

Figure 4A:
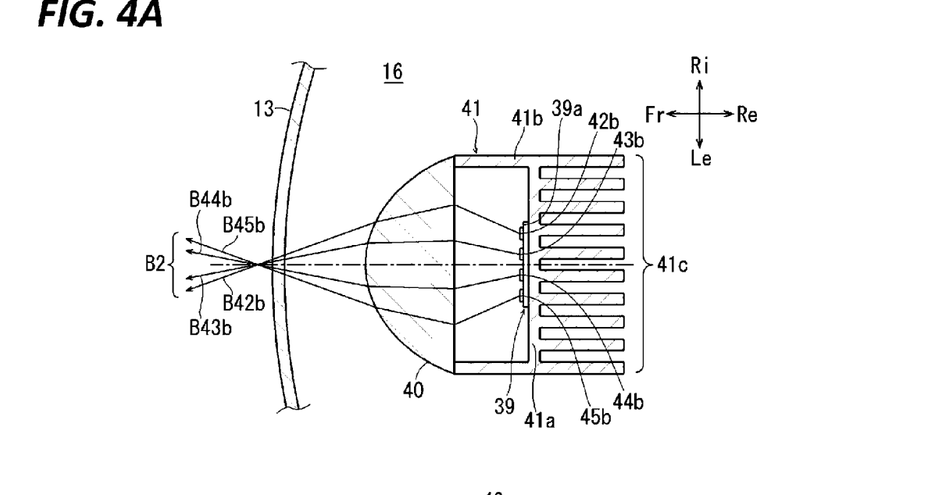
FIG. 4A is a horizontal cross-sectional view taken along line II-II in FIG. 2 illustrating an electronic variable lamp unit.

The traveling lamp unit 16 illustrated in FIGS. 2 and 4A includes a first LED array 39, a transparent or translucent planoconvex projection lens 40, and a metal lens holder 41, and is connected to the control device 25 in FIG. 3 (not illustrated in FIG. 4A). The lens holder 41 is constituted by a hollow box-shaped body portion 41a, a light source support 41b, and a plurality of heat radiating fins 41c protrusively provided rear of the body portion 41a. The projection lens 40 is fixed to be convex forward of the front end portion of the cylindrical shape light source support 41b protrusively provided forward of the body portion 41a, and the first LED array 39 is disposed on the front surface of the body portion 41a to be positioned in the vicinity of a rear focal point of the projection lens 40.

Figure 4B:
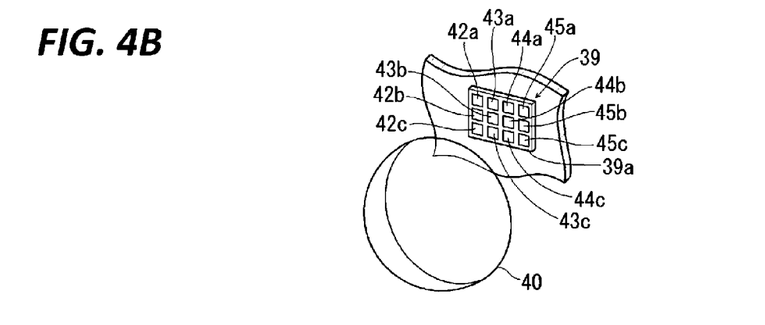
FIG. 4B is a perspective view of an LED array and a projection lens of the electronic variable lamp unit as viewed from the front side.

The first LED array 39 according to the embodiment illustrated in FIGS. 4A and 4B is formed by total 12 LED light emitting elements in which three sets (LED light emitting elements 42b to 45b and 42c to 45c) of four white LED light emitting elements 42a to 45a arranged in the left-right direction are arranged in the vertical direction. However, the number of the LED light emitting elements is not limited thereto. The 12 LED light emitting elements are disposed toward the same direction, and are controlled by the control device 25 to be turned ON/OFF independently.

As illustrated in FIG. 4A, each of light rays (B42b to B45b to be described later) that constitutes a light flux B2 by the first LED array 39 transmits the projection lens 40 and the focal points thereof are connected, so that a light image, which is inverted up and down, and left and right, is displayed at the front side. When lights generated from each of the LED light emitting elements 42a to 45a, 42b to 45b, and 42c to 45c of the first LED array 39 illustrated in FIG. 4B are referred to as B42a to B45a, B42b to B45b, and B42c to B45c, each light is irradiated at the position which is inverted up and down, and left and right as illustrated in FIG. 4C.

The traveling lamp unit 16 in FIGS. 2 and 4B generates swivel light that swings light to the left and right as follows.

Figure 4C:
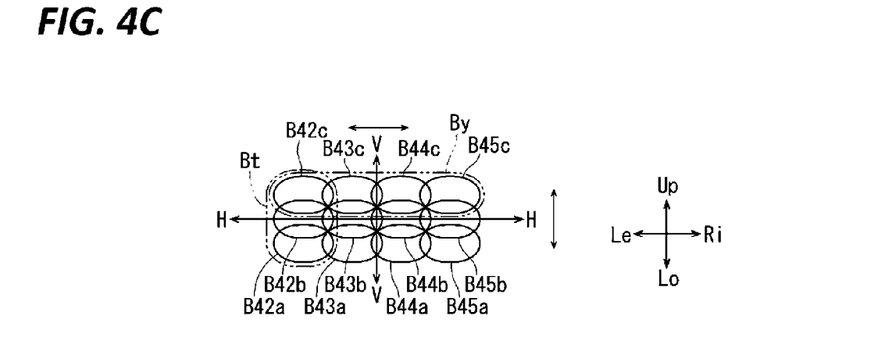
FIG. 4C is an explanatory view of a swivel action and a leveling action of light distribution in the electronic variable lamp unit.

Specifically, each of the light emitting element groups is turned ON/OFF by the control device 25 in the order of the LED light emitting element group 42a, 42b, and 42c, which is a first column illustrated in FIG. 4B, the LED light emitting element group 43a, 43b, and 43c, the LED light emitting element group 44a, 44b, and 44c, and the LED light emitting element group 45a, 45b, and 45c, so that a light distribution Bt by the LED light emitting elements 42a, 42b, and 42c group illustrated in FIG. 4C appears to move to the right direction to the position of the light group B45a, B45b, and B45c, and conversely, the turn-on/off of the LED light emitting element groups is turned ON/OFF in the order from the LED light emitting element group 45a, 45b, and 45c to the LED light emitting element group 42a, 42b, and 42c, so that the light group B45a, B45b, and B45c appears to move to the left direction. As a result, swivel light is generated.

Further, the traveling lamp unit 16 in FIGS. 2 and 4B generates swivel light that swings the light in the vertical direction as follows. Specifically, each of the light emitting element groups is turned ON/OFF by the leveling light control device 25 in the order of the LED light emitting element group 42c, 43c, 44c, and 45c, which is a first row, the LED light emitting element group 42b, 43b, 44b, and 45b, and the LED light emitting element group 42a, 43a, 44a, and 45a, so that a light distribution By by the LED light emitting element group 42c, 43c, 44c, and 45c appears to move downward to the position of the light group B42a, B43a, B44a, and B45a, and conversely, the turn-on/off of the LED light emitting element groups is turned ON/OFF in the order from the LED light emitting element group 42a, 43a, 44a, and 45a to the LED light emitting element group 42c, 43c, 44c, and 45c, so that the light group B42a, B43a, B44a, B45a appears to move upward. As a result, leveling light is generated.

The traveling lamp unit 17 in FIG. 2 having the same configuration as the traveling lamp unit 16 illustrated in FIG. 4A and disposed below the traveling lamp unit 16, and the pair of turn-off light units 18 and 19 disposed on the outer side of the traveling lamp units 16 and 17 and oriented toward the front side oblique to the right side may turn ON/OFF the LED light emitting elements of the first LED array 39 to the fourth LED array in a predetermined range based on the associated control by the control device 25, so that, as illustrated in FIG. 5B, the irradiation direction of a light distribution pattern by a light flux B2' of the traveling lamp units 16 and 17 and a light flux B3' of the turn-off light units 18 and 19 that is swung together with the light flux B2' is swung (swivel action) leftward or rightward at a steering irradiation angle δ2 (with each position of the aircraft lamp on the left and right sides as a center of rotation O1, assuming that the rightward tilt from the straight line L0 is positive, and the leftward tilt is negative) in a predetermined left-right direction from the traveling direction (forward along the straight line L0 extending in the longitudinal direction of the airframe), may function as the traveling lamp, and additionally, may swing (leveling action) the irradiation direction of the light distribution pattern by the light flux B2 upward or downward from the traveling direction (forward along the straight line L0 extending in the longitudinal direction of the airframe) of the aircraft 1 so as to be used as a landing light.

Meanwhile, as the first landing lamp unit according to the embodiment, an electronic variable lamp unit such as the traveling lamp unit 16 may be adopted instead of the mechanical landing lamp units 14 and 15, and a mechanical variable lamp unit such as the landing lamp unit 14 may be adopted instead of the electronic traveling lamp units 16 and 17 and the turn-off light units 18 and 19 that constitute the second variable lamp unit.

Next, descriptions will be made on a configuration of the control device 25 of the right-side aircraft lamp 7, and a connection configuration of the first landing lamp units 14 and 15, the traveling lamp units 16 and 17 and the turn-off light units 18 and 19, the second landing lamp unit 21, and a behavior detection unit 48 that detects the behavior of the airframe of the aircraft 1, which are connected to the control device 25, with reference to FIG. 6. The control device 25 includes an ECU 25a, a ROM 25b, and a RAM 25c. The ECU 25a includes a light source controller 25d that controls turn-on/off of each of the light sources 14a, 15a, and 21a, the first LED array 39, and the second to the fourth LED arrays 49 to 51, and a swing controller 25e connected to the swivel motors 31 and 31 and the actuators 33 and 33 of the first landing lamp units 14 and 15. A control program of the ECU 25a executed in the RAM 25c is stored in the ROM 25b. The ECU 25a is connected to an altimeter 59 that detects an altitude of the aircraft 1.

Figure 6:
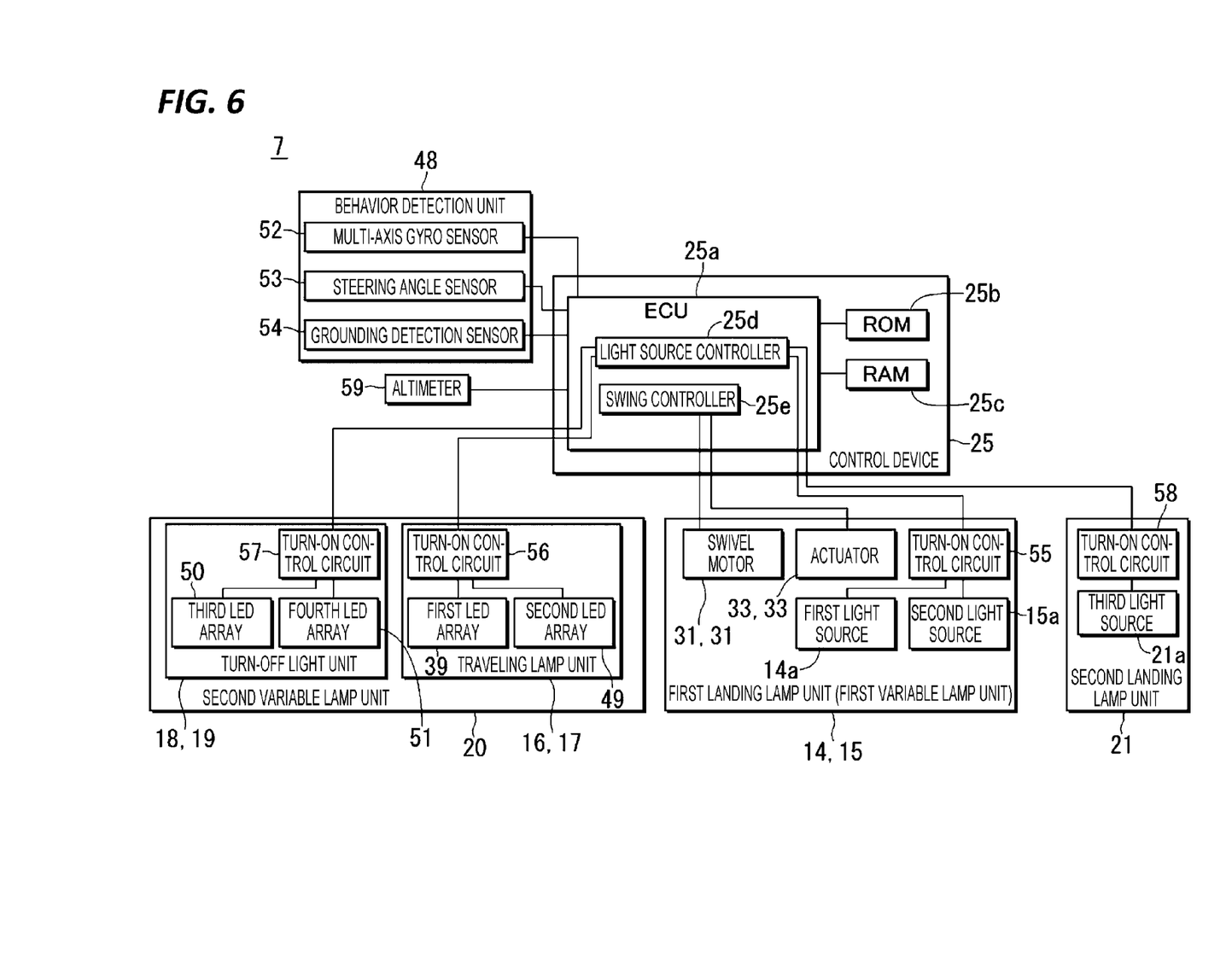
FIG. 6 is a block diagram of the aircraft lamp according to the embodiment.

The behavior detection unit 48 in FIG. 6 includes a multi-axis gyro sensor 52, a steering angle sensor 53, and a grounding detection sensor 54, which are connected to the ECU 25a. The multi-axis gyro sensor 52 is a two-axis or three-axis gyro sensor that functions as an elevation angle sensor of the aircraft 1 and detects the left-right tilt angle, and acquires an angular velocity around the straight line L0 extending in the longitudinal direction of the fuselage 2 of the aircraft 1 illustrated in FIGS. 1A and 1B and two-axis posture angles (roll angle RL and pitch angle PI) of the aircraft 1 at least at a predetermined time from an angular velocity around a straight line L1 orthogonal to the straight line L0 and extending to the left and right from the fuselage 2. The ECU 25a calculates each of an elevation angle (vertical tilt angle) a of the aircraft 1 with respect to a straight line H along the horizontal direction illustrated in each drawing in FIGS. 7A to 7D (to be described later) from the two-axis posture angles RL and PI, and a left-right tilt angle α' illustrated in each drawing in FIGS. 8A to 8C. The steering angle sensor 53 is a sensor that detects a steering direction and a steering angle of a control stick (not illustrated) of the aircraft 1 during ground traveling. The grounding detection sensor 54 is, for example, a stroke sensor provided in a damper (not illustrated) of the front leg 11 of the aircraft 1 in FIG. 1A, and is a sensor that detects the landing state of the aircraft 1 to the runway by detecting a change in a damper stroke from a predetermined position.

As illustrated in FIG. 6, the first light source 14a and the second light source 15a of the first landing lamp units 14 and 15 are connected to the light source controller 25d of the ECU 25a via a turn-on control circuit 55, and are controlled to be turned ON/OFF at a predetermined timing is controlled. The swing controller 25e of the ECU 25a controls the actuators 33 and 33 to swing (leveling action) the first landing lamp units 14 and 15 either upward or downward, so that light B1" is swung at a predetermined vertical irradiation angle γ (illustrated in each drawing of FIGS. 7A to 7D), and controls the swivel motors 31 and 31 to swing (swivel action) the first landing lamp units 14 and 15 either leftward or rightward and to swing the light B1" either leftward or rightward at a left-right irradiation angle M (illustrated in each drawing in FIGS. 8A to 8C), so that the light distribution pattern of the landing lamp is irradiated forward and oblique downward of the aircraft 1.

Further, as illustrated in FIG. 6, each of the first LED array 39 and the second LED array 49 of the traveling lamp unit 16 and 17, the third LED array 50 and the fourth LED array 51 of the turn-off light units 18 and 19 is connected to the light source controller 25d via turn-on control circuits 56 and 57, and the LED light emitting elements in a predetermined range mounted on each LED array are controlled to be turned ON/OFF at a predetermined timing. The light source controller 25d of the ECU 25a turns ON/OFF the LED light emitting elements 42a to 45a, 42b to 45b, and 42c to 45c of the first LED array 39, and an LED light emitting element group in a predetermined range of a plurality of LED light emitting elements (not illustrated) of the second LED array 49 in a predetermined order via the turn-on control circuit 56 to swing (swivel action) the light B2' in FIG. 5B either leftward or rightward at the steering irradiation angle δ2 in a predetermined left-right direction, so that the light distribution pattern of the traveling lamp is irradiated to either the front side oblique to the left side or the front side oblique to the right side from the traveling direction of the aircraft 1. Further, the first LED array 39 and the second LED array 49 may swing the light B2' in any of the upward or downward direction by the turn-on/off control of each of the LED light emitting element groups by the light source controller 25.

Further, the third LED array 50 and the fourth LED array 51 of the turn-off light units 18 and 19 are connected to the light source controller 25d via the turn-on control circuit 57, and the LED light emitting elements in a predetermined range among a plurality of LED light emitting elements mounted on each LED array are controlled to be turned ON/OFF at a predetermined timing. The light B3' in FIG. 5B generated by the third LED array 50 and the fourth LED array 51 is swung at the left-right irradiation angle δ2 together with the light B2' based on the control of the light source controller 25d associated with the light B2' by the traveling lamp units 16 and 17, and displays the light distribution pattern of the turn-off light around the aircraft 1.

Further, the third light source 21a of the second landing lamp unit 21 is connected to the light source controller 25d of the ECU 25a via a turn-on control circuit 58, and is controlled to be turned ON/OFF at a predetermined timing is controlled. When the landing of the aircraft 1 on the runway is detected by the grounding detection sensor 54, the ECU 25a performs the turn-off control of the first landing lamp units 14 and 15 and performs switching turn-on control to the third light source 21a of the second landing lamp unit 21 at the same time, and irradiates the light distribution pattern for the gliding in parallel with the straight line L0 extending in the longitudinal direction of the fuselage 2 of the aircraft 1. However, when the grounding detection sensor 54 detects that the front leg 11 is separated from the runway, the ECU 25a performs the turn-off control of the second landing lamp unit 21 and performs switching control to the first landing lamp units 14 and 15.

Meanwhile, the left-side aircraft lamp 6 also includes the control device and the behavior detection unit, which are provided and connected with the same configuration as the right-side aircraft lamp 7, and irradiates the light distribution pattern synthesized by performing the control of the variable light distribution pattern associated with the right-side aircraft lamp 7 forward of the aircraft 1.

Next, descriptions will be made on a specific leveling control of the synthetic light B1" by the first landing lamp units 14 and 15 (not illustrated for the left-side aircraft lamp 6) by the left-side aircraft lamp 6 and the right-side aircraft lamp 7 with reference to FIGS. 2, 5A, 6, and 7A to 7D. Drawings in FIGS. 7A to 7D are illustrating the situations in the order until the aircraft in flight lands on the runway.

Further, when the vertical tilt angle of the aircraft 1 from the horizontal line H that indicates the horizontal direction is referred to as a, the irradiation angle of the light B1" of the first landing lamp units 14 and 15 oblique downward from the horizontal line H is referred to as the above described angle β, the irradiation angle of the light B1" of the first landing lamp units 14 and 15 oblique downward from the straight line L0 extending in the longitudinal direction of the fuselage 2 of the aircraft 1 is referred to as the vertical irradiation angle γ (with the position of the left-side and right-side aircraft lamps as a center of rotation O1, assuming that the upward tilt from the straight line L0 is positive, and the downward tilt is negative), the control device 25 may control the first landing lamp units 14 and 15 such that the vertical irradiation angle γ of the synthetic light B1" becomes γ=β+α.

Figure 7A:
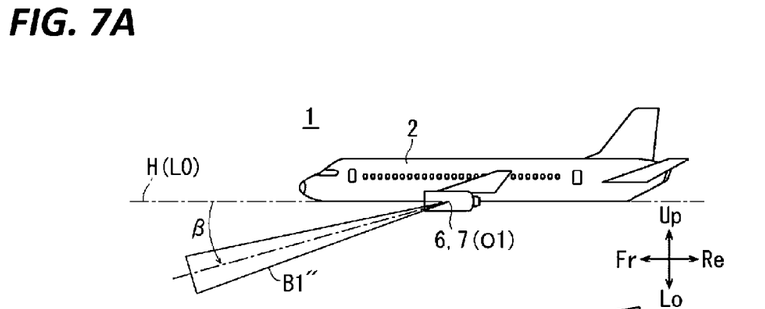
FIG. 7A is an explanatory view of leveling control by the first landing lamp unit in an aircraft during level flight.

Specifically, as illustrated in FIG. 7A, when the aircraft 1 is in level flight, the vertical tilt angle α of the aircraft 1 from the horizontal line H obtained via the multi-axis gyro sensor 52 is 0°. In this case, since the straight line L0 extending in the longitudinal direction of the fuselage 2 of the aircraft 1 is in parallel with the horizontal line H, the first landing lamp units 14 and 15 of the left-side and right-side aircraft lamps 6 and 7 irradiate the synthetic light B1" such that the vertical tilt angle γ becomes γ=β+0°=angle β, based on the control of the actuator 33 by the control device 25.

Figure 7B:
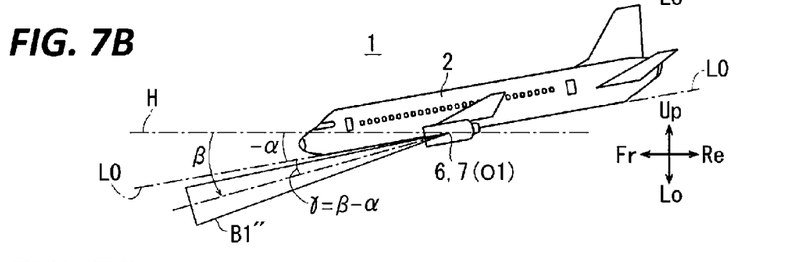
FIG. 7B is an explanatory view of leveling control by the first landing lamp unit in an aircraft with a nose lowered from the horizontal direction.

Further, as illustrated in FIG. 7B, when the nose of the aircraft 1 is lowered from the horizontal line H, and the vertical tilt angle of the aircraft 1 becomes −α, the first landing lamp units 14 and 15 irradiate the synthetic light B1" such that the vertical tilt angle γ becomes γ=β+(−α)=β−α, based on the control of the actuator 33 by the control device 25. In this case, even though the nose of the aircraft 1 is lowered, the tilt angle of the synthetic light B1" from the horizontal line H becomes the angle β, which is the same as the case of level flight, and the direction of the light B1" of the landing lamp is kept constantly without blurring from the horizontal direction H, and thus, the field of view of the operator is kept constantly.

Figure 7C:
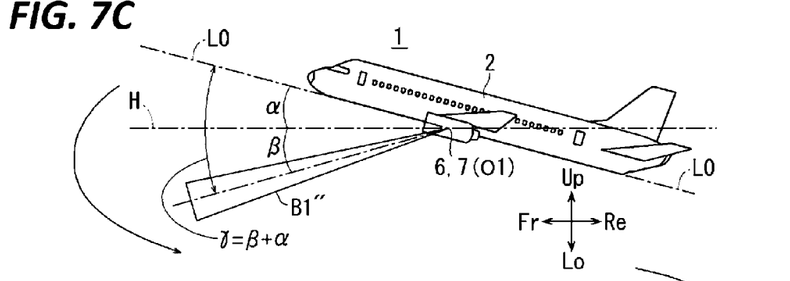
FIG. 7C is an explanatory view of leveling control by the first landing lamp unit in an aircraft with a nose raised from the horizontal direction.

Further, as illustrated in FIG. 7C, when the aircraft 1, which is in landing attitude, raises the nose from the horizontal line H, and the vertical tilt angle of the aircraft 1 becomes α, the first landing lamp units 14 and 15 irradiate the synthetic light B1" such that the vertical tilt angle γ becomes γ=β+α, based on the control of the actuator 33 by the control device 25. Also in this case, even though the nose of the aircraft 1 is raised, the tilt of the synthetic light B1" from the horizontal line H becomes the angle β, which is the same as the case of level flight, and the direction of the light B1" of the landing lamp is kept constantly without blurring from the horizontal direction H, and thus, the field of view of the operator is kept constantly.

As illustrated in FIGS. 7A to 7C as described above, when the first landing lamp units 14 and 15 are controlled, even in any one of the cases where the nose of the aircraft is horizontal, downward or upward from the horizontal direction, the light B1" irradiated by the first landing lamp units 14 and 15 is irradiated at the constant angle β oblique downward from the horizontal line H, and is not changed from the horizontal direction even when the posture of the airframe is changed in the vertical direction, and thus, the field of view of the operator is kept constantly.

Meanwhile, it is assumed that the higher the altitude of the aircraft 1 obtained by the altimeter 59, the longer the remaining distance from the aircraft 1 to the runway, and thus the irradiation angle β of the synthetic light B1" irradiated oblique downward by the first landing lamp units 14 and 15 may be set to be inversely proportional to the altitude so that the synthetic light B1″ may be irradiated farther, and may be controlled such that the irradiation angle β becomes smaller as the altitude increases, and the irradiation angle increases as the altitude decreases.

Figure 7D:
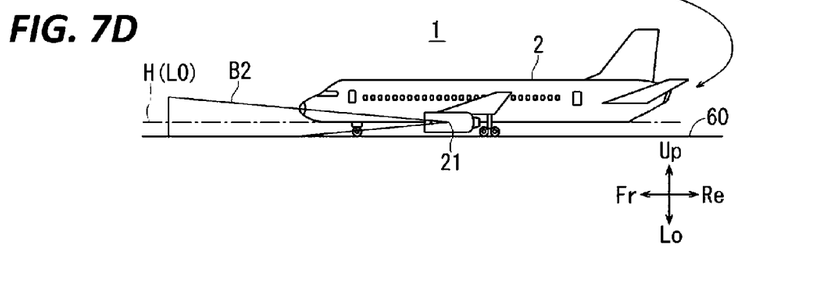
FIG. 7D is an explanatory view of switching control from the first landing lamp unit to a second landing lamp unit at the time of landing.

Further, as illustrated in FIG. 7D, in the landing of the aircraft 1 on a runway 60, the control device 25 in FIG. 6 may turn OFF the light B1″ by performing the turn-off control of the first light source 14a and the second light source 15a of the first landing lamp units 14 and 15 at the moment at which the landing is detected via the grounding detection sensor 54 provided in the damper of the front leg 11, and perform the switching turn-on control of the third light source 21a of the second landing lamp unit 21, so that the light B2 extending forward along the runway 60 is irradiated.

Figure 8A:
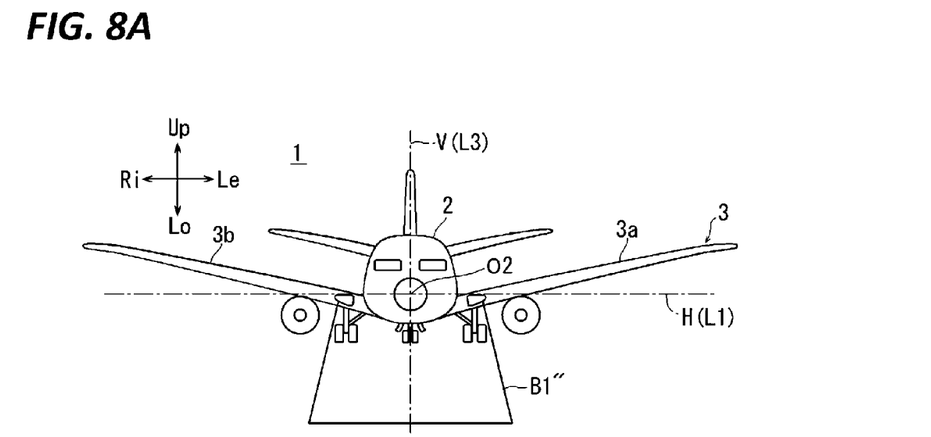
FIG. 8A is an explanatory view of left-right swivel control by the first landing lamp unit in an aircraft during level flight.

Next, descriptions will be made on a specific swivel control of the synthetic light B1″ by the first landing lamp units 14 and 15 by the left-side aircraft lamp 6 and the right-side aircraft lamp 7 (not illustrated for the left-side aircraft lamp 6) with reference to FIGS. 2, 5B, 6, and 8A to 8C. In FIG. 8A, the aircraft 1 in level flight is illustrated, and the aircraft 1 is in landing attitude and irradiates the synthetic light B1″ by the first landing lamp units 14 and 15 forward and oblique downward in the vertical cross-section including the straight line L0. Here, when the straight line extending in the left-right direction from the fuselage 2 of the aircraft 1 and serving as a reference for the tilt of the airframe is referred to as L1, the left-right tilt angle of the aircraft 1 in the left-right direction from the horizontal line H indicating the horizontal direction is referred to as a′ (the center of rotation of the aircraft is referred to a reference numeral O2, and the case where the left-side main wing 3a viewed from the front is tilted upward from the horizontal line H passing through the center of rotation O2 is positive, and the case where the right-side main wing is tilted upward is negative), the straight line indicating the vertical direction is referred to as a vertical line V, the straight line extending in the vertical direction of the airframe (fuselage 2) of the aircraft 1 and serving as a reference for the irradiation direction of the light B1″ is referred to as L3, the irradiation angle of the light B1″ in either the left or right direction from the directly downward direction of the airframe (fuselage) along the straight line L3 is referred to as the left-right irradiation angle δ1, the control device 25 may control the first landing lamp units 14 and 15 such that the left-right irradiation angle δ1 becomes δ1=−α′, that is, the left-right irradiation angle M is tilted by an amount of the left-right tilt angle α′ in the direction opposite to the left-right tilt direction of the airframe from the directly downward direction of the airframe (fuselage) along the straight line L3.

Figure 8B:
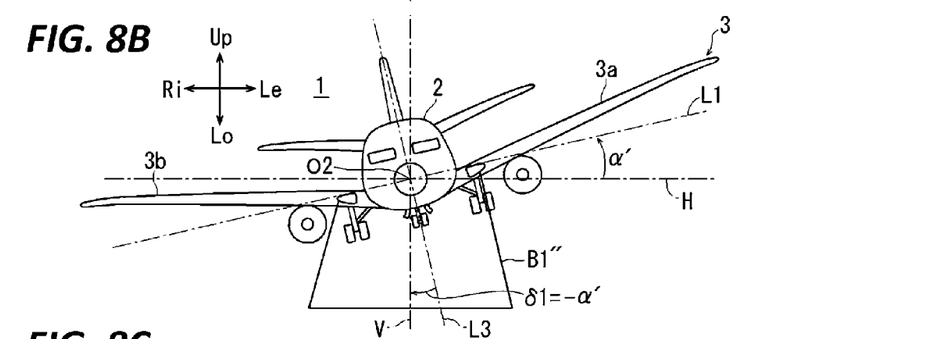
FIG. 8B is an explanatory view of left-right swivel control by the first landing lamp unit in an aircraft with a left wing raised from the horizontal direction.

Specifically, as illustrated in FIG. 8B, when the left-side main wing 3a of the aircraft 1 is raised from the horizontal line H obtained via the gyro sensor 52, and the left-right tilt angle of the aircraft 1 becomes α′, the first landing lamp units 14 and 15 irradiate the synthetic light B1″ such that the left-right irradiation angle M from the direct down of the airframe becomes δ1=−α′, based on the control of the swivel motor 31 by the control device 25. In this case, even when the aircraft 1 is tilted such that the left-side main wing 3a is raised, the synthetic light B1″ irradiated from the first landing lamp units 14 and 15 is kept constantly without blurring in the left-right direction by offsetting the tilt with respect to the vertical plane including the traveling direction of the airframe, and thus, the field of view of the operator is kept constantly.

Figure 8C:
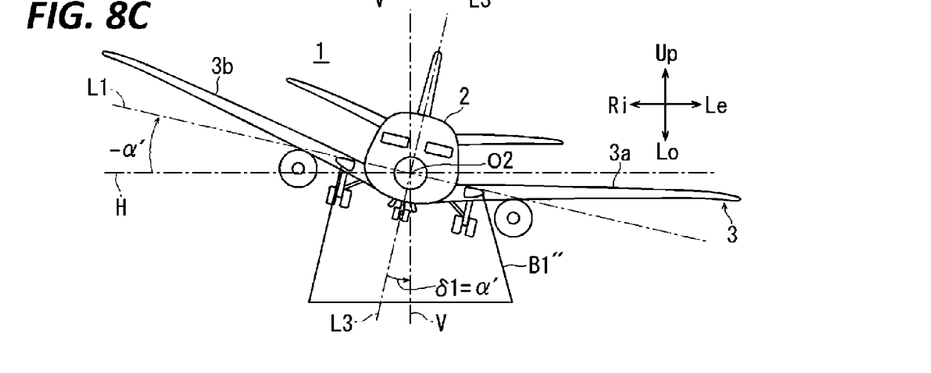
FIG. 8C is an explanatory view of left-right swivel control by the first landing lamp unit in an aircraft with a right wing raised from the horizontal direction.

Further, as illustrated in FIG. 8C, when the right-side main wing 3b of the aircraft 1 is raised from the horizontal line H, and the left-right tilt angle of the aircraft 1 becomes −α′, the first landing lamp units 14 and 15 irradiate the synthetic light B1″ such that the left-right irradiation angle δ1 from the direct down of the airframe becomes δ1=α′, based on the control of the swivel motor 31 by the control device 25. In this case, even when the aircraft 1 is tilted such that the right-side main wing 3b is raised, the synthetic light B1″ irradiated from the first landing lamp units 14 and 15 is kept constantly without blurring in the left-right direction by offsetting the tilt with respect to the vertical plane including the traveling direction of the airframe, and thus, the field of view of the operator is kept constantly.

Next, descriptions will be made on a specific swivel control of the light by the traveling lamp units 16 and 17 by the left-side aircraft lamp 6 and the right-side aircraft lamp 7, and the turn-off light units 18 and 19 with reference to FIGS. 2, 5B, 6, 9A and 9B. Meanwhile, in FIGS. 5B, 9A and 9B, the synthetic light irradiated from the traveling lamp units 16 and 17 of the right-side aircraft lamp 7 is described as a reference numeral B2′, the synthetic light irradiated from the turn-off light units 18 and 19 is described as a reference numeral B3′, the synthetic light irradiated from the traveling lamp unit (not illustrated) of the left-side aircraft lamp 7 is described as a reference numeral B2″, and the synthetic light irradiated from the turn-off light (not illustrated) is described as a reference numeral B3″.

Figure 9A:
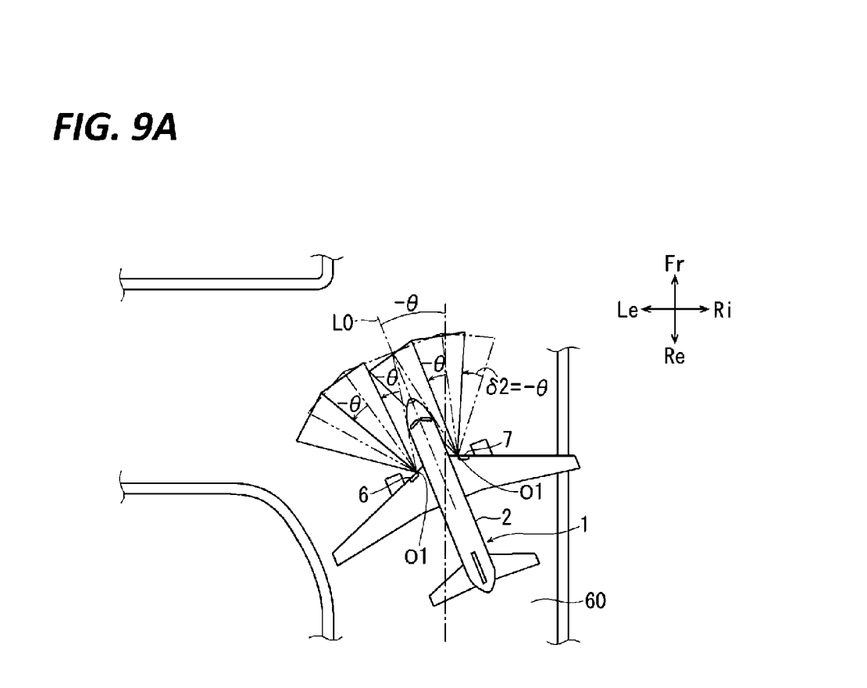
FIG. 9A is an explanatory view of swivel control of a traveling lamp unit and a turn-off light unit in an aircraft in which left steering is executed during ground traveling.
Figure 9B:
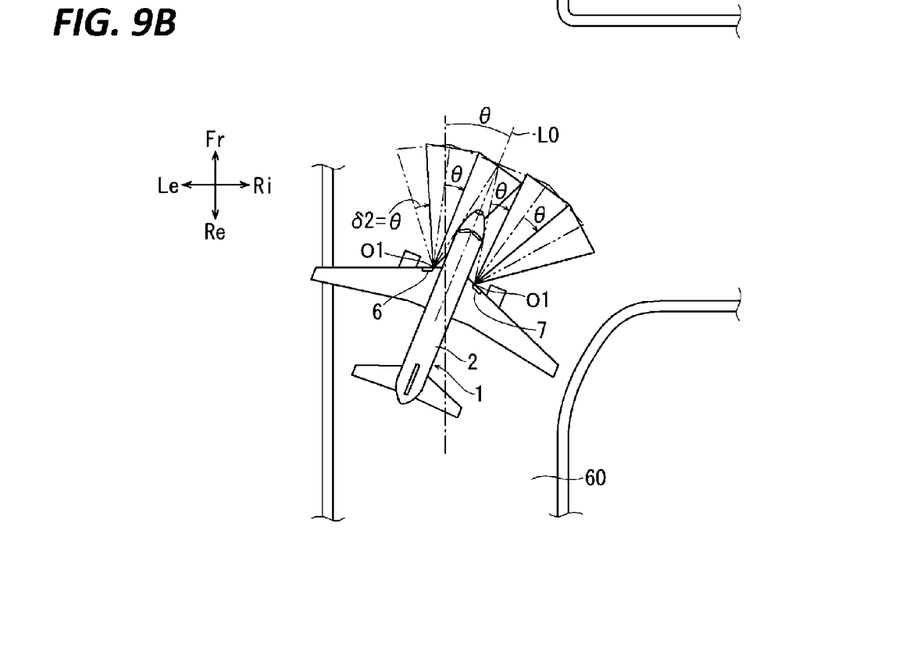
FIG. 9B is an explanatory view of swivel control of a traveling lamp unit and a turn-off light unit in an aircraft in which right steering is executed during ground traveling.

In FIG. 5B, it is assumed that the aircraft 1 straightly glides on the runway at the steering angle of 0° without swiveling the irradiation light by the traveling lamp unit and the turn-off light unit. Meanwhile, FIG. 9A illustrates a situation in which the aircraft 1 that is gliding on the runway turns left. In FIGS. 9A and 9B, descriptions will be made by assuming that a steering angle θ of the control stick is positive on the left side and negative on the right side, and, for the steering irradiation angle δ2 (tilt of the light from the straight line L0 extending in the longitudinal direction of the fuselage 2 of the aircraft 1 with the position of each of the left and right aircraft lamps as the center of rotation O1) of the light by the traveling lamp unit and the turn-off light unit, the tilt to the right side is positive and the tilt to the left side is negative.

As illustrated in FIG. 9A, when the control stick (not illustrated) is turned to the left by the operator of the aircraft 1 that is gliding on the runway 60, the steering angle sensor 53 in FIG. 6 detects the steering leftward and the steering angle θ. At this time, the control device 25 calculates the steering irradiation angle δ2 from the steering angle θ, and controls the traveling lamp units 16 and 17 and the turn-off light units 18 and 19 such that the steering irradiation angle δ2 of the synthetic lights B2′, B3′, B2″, and B3″ becomes δ2=−θ, so that the light distribution pattern of the traveling lamp and the turn-off light is tilted leftward to be the same as the steering angle θ. In this manner, the direction of the irradiation light by the second variable lamp unit 20 illustrated in FIG. 6 is changed according to the steering direction and the steering angle, and the field of view of the operator is appropriately illuminated by appropriately irradiating the traveling direction of the aircraft 1 during cornering. For example, the irradiation light is irradiated such that the shadow of the wheel of the front leg 11 (see FIG. 1A) of the aircraft 1 is not formed on the road surface.

Meanwhile, as illustrated in FIG. 9B, when the control stick (not illustrated) is turned to the right by the operator of the aircraft 1 that is gliding on the runway 60, the steering angle sensor 53 in FIG. 6 detects the steering rightward and the steering angle θ. At this time, the control device 25 controls the traveling lamp units 16 and 17 and the turn-off light units 18 and 19 such that the steering irradiation angle δ2 of the synthetic lights B2', B3', B2", and B3" becomes δ2=θ, so that the light distribution pattern of the traveling lamp and the turn-off light is tilted rightward to be the same as the steering angle θ.

As described above, according to the aircraft lamps 6 and 7 according to the embodiment, the aircraft 1 traveling on the runway 60 is steered to either the left or the right, and, as a consequence, the direction of the synthetic lights B2', B3', B2", and B3" generated from the traveling lamp units 16 and 17, and the turn-off light units 18 and 19 is changed in the steering direction by an amount of the steering irradiation angle based on the steering direction and the steering angle from the front-rear direction of the aircraft 1. The light distribution pattern by the synthetic lights B2', B3', B2", and B3" irradiated from the traveling lamp units 16 and 17, and the turn-off light units 18 and 19 is oriented either leftward or rightward by the amount of the steering irradiation angle in the same direction as the steering direction, and thus, the traveling direction of the aircraft 1 during cornering on the runway 60 is appropriately illuminated, and the field of view of the operator is appropriately illuminated.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. An aircraft lamp comprising:
a variable lamp including a light source and configured to change an irradiation direction of light;
a behavior detector configured to detect behavior of an airframe; and
a controller configured to control the irradiation direction of the light by the variable lamp based on a detection result of the behavior of the airframe,
wherein the behavior detector is a sensor that detects a left-right tilt of the airframe from a horizontal direction as a left-right tilt angle,
the controller calculates a left-right irradiation angle of the variable lamp from the left-right tilt angle of the airframe, and
the variable lamp irradiates the light on a plane perpendicular to a traveling direction of the airframe by tilting the light with an amount of the left-right tilt angle from a directly downward direction of the airframe in a direction opposite to a left-right tilt direction of the airframe.

2. The aircraft lamp according to claim 1, wherein the behavior detector is an elevation angle sensor that detects an elevation angle of the airframe,
the controller calculates a vertical irradiation angle of the variable lamp by adding a predetermined angle to the elevation angle detected by the elevation angle sensor, and
the variable lamp irradiates the light on a vertical plane including the traveling direction of the airframe by tilting the light with an amount of the vertical irradiation angle from the traveling direction of the airframe.

3. The aircraft lamp according to claim 1, wherein the behavior detector is a steering angle sensor that detects a steering direction and a steering angle of the airframe,
the controller calculates a left-right direction steering irradiation angle of the variable lamp from the steering angle of the airframe detected by the steering angle sensor, and
the variable lamp irradiates the light by tilting the light with an amount of the left-right direction steering irradiation angle in the steering direction from the traveling direction of the airframe.

4. The aircraft lamp according to claim 3, wherein the variable lamp is provided near a base end portion of a main wing of the airframe.

5. The aircraft lamp according to claim 1, further comprising:
a plurality of the variable lamps,
wherein the plurality of variable lamps include a first variable lamp and a second variable lamp.

* * * * *